United States Patent

Schoneborn

[15] 3,648,286
[45] Mar. 7, 1972

[54] METHOD AND APPARATUS FOR SEARCHING, SELECTING AND TRACKING TARGETS UTILIZING A RADAR HAVING A RANGE GATE

[72] Inventor: Hellmuth Schoneborn, Assling, Germany

[73] Assignee: Messerschmitt-Bolkow-Blohm Gesellschaft Mit Beschrankter Haftung, Ottobrunn near Munich, Germany

[22] Filed: Dec. 2, 1969

[21] Appl. No.: 881,547

[30] Foreign Application Priority Data

Dec. 13, 1968 Germany...................P 18 14 476.8

[52] U.S. Cl. ................................................. 343/7.3
[51] Int. Cl. ................................................. G01s 9/14
[58] Field of Search ..................................... 343/7.3

[56] References Cited

UNITED STATES PATENTS 2,717,999  9/1955  Lewinstein................................343/7.3
3,495,245  2/1970  Leyde........................................343/7.3

Primary Examiner—T. H. Tubbesing
Attorney—McGlew and Toren

[57] ABSTRACT

In a method for searching, selecting and tracking targets in a given range, utilizing a radar set having a range gate, two successive and contiguous gating pulses are generated responsive to transmission of each radar pulse, and have a duration and position, relative to the radar pulse, corresponding to the target area to be covered so as to contain all echo pulses resulting from the radar pulse. The two gating pulses are displaced, in time, relative to the echo pulses in a time direction such that each gating pulse contains the same content of echo pulse energy or, alternatively speaking, so that the echo pulse having the maximum amplitude is evenly divided between the two gating pulses and centered on the separation line therebetween. The durations of the gating pulses are then decreased, either continuously or stepwise, so that the combined duration is substantially equal to the duration of the echo pulse having the maximum amplitude, while both gating pulses are displaced, in time, relative to this pulse so that the echo pulse remains centered on the separation line between the two gating pulses. The apparatus includes a differential amplifier, a sawtooth wave generator, a comparator and at least one pair of pulse circuits, with the sawtooth generator being triggered by the radar pulse transmitter.

10 Claims, 8 Drawing Figures

Patented March 7, 1972

INVENTOR

Hellmuth Schöneborn

By  *[signature]*
ATTORNEYS

INVENTOR

Hellmuth Schöneborn

By

ATTORNEYS

METHOD AND APPARATUS FOR SEARCHING, SELECTING AND TRACKING TARGETS UTILIZING A RADAR HAVING A RANGE GATE

BACKGROUND OF THE INVENTION

Methods for searching and tracking targets lying in a predetermined target area are used, for example, in missiles equipped with search radar heads. Such a missile, which generally is launched from an aircraft, has the task to find, after traveling a given distance in self-guided or unguided flight, a target in the predetermined target area, by means of its active search radar head, and, by tracking this target, to effect ultimate collision with the target. For this purpose, the target has been located by the radar of the mother aircraft prior to launching of the missile, and the space coordinates of the target, such as azimuth and range, have been set into the missile.

Depending on the magnitude of its own velocity, the target may move away, during the self-guided or unguided flight phase of the missile, from the original location determined by the mother aircraft. Thus, a target area increased by the distance traveled by the target during this time must be searched in order to locate the target using the search radar on the missile.

It is known to use, for automatic tracking of targets by means of radar equipment, so-called "range gates" which are displaced, relative to the echo pulses reflected by the target, until they coincide with these echo pulses. Thereby, the target is located and can be tracked by the radar by letting the range gate oscillate about the echo pulses reflected by the target, such an automatic tracking arrangement being disclosed, for example, in U.S. Pat. No. 2,740,112.

During scanning of a target, with a range gate searching a given range area, a definite minimum number of reflected pulses must be received, and these are integrated for initiation of the tracking process. Consequently, random single pulses which can, for example, originate through thermal noise, must be eliminated. Due to the required minimum number of pulses per gate width, however, the search velocity is limited.

A further disadvantage resides in that, in the presence of several targets in a target area, the search radar of the missile locks on to the first scanned target and tracks it until collision occurs. This disadvantage is particularly objectionable when missiles of this type are deployed against maritime targets as, for example, when searching for a formation of ships. The possibility exists that the search radar of the missile will lock on to a relatively small and unimportant ship, scanned by it as the first target, while very much larger and consequently, in most cases, more valuable shipping units nearby are then no longer tracked by the search radar of the missile.

SUMMARY OF THE INVENTION

This invention relates to searching, selection and tracking of targets in a given range utilizing a radar set having a range gate and, more particularly, to a novel and improved method of and apparatus for this purpose requiring a shorter search time and capable of selecting, among several simultaneously located targets of different range, the largest target and to track the largest target to collision, using an apparatus which is as simple as possible.

Based upon a method for the searching, selection and tracking of targets in a definite range area by means of a radar set operating automatically with a so-called range gate, the objective of the invention is attained by always generating two gating pulses of equal duration and following each other without any spacing. The duration and location of these pulses, relative to the radar pulse, correspond to the target area to be acquired. The two gating pulses, always containing all the echo pulses from the target area, are displaced, in time, relative to the echo pulses in such a manner that, in each of the two gating pulses there always occur echo pulses having equal energy content. The gating pulses are shortened in time, either continuously or by steps, to substantially the duration of an echo pulse, both gating pulses always being automatically displaced in time relative to the echo pulses in such a manner that the echo pulse or pulses always occur in each of the two gating pulses with the same energy content.

With the invention method, targets are immediately acquired, in the target area to be searched, by the initially relatively long gating pulses, and are tracked, by means of a subsequently occurring continuous or stepwise shortening of the duration of the gating pulses, with the same accuracy as is the case with known methods. Through the simultaneous use of two gating pulses following each other without an intervening interval, which are always displaced relative to the echo pulses coinciding therewith in a manner such that, during the two gating pulses, echo pulses of equal energy content are always present, the largest target, of a plurality of targets, which is automatically indicated by the echo pulse with the largest energy content, is selected in the process of shortening the gating pulses. This target is tracked, after the gating pulses have been shortened to substantially the duration of an echo pulse, up to the time of arrival of the missile at the target. In this manner, there is a determination, by comparison of the echo power of all targets present in a predetermined target area, of the target with the largest echo power, and this is made the basis for further target tracking.

When using the invention method in conjunction with the search radar of a missile, the information relative to a target to be hit, determined by a radar equipment separate from the missile, for example that of a mother aircraft, is set into the missile immediately prior to launching of the latter. The automatically operating search radar is switched on after the missile has traveled a predetermined distance in the direction of the target. It is therefore possible to limit the duration and position of the range-gating pulses at the beginning of the search process rather accurately to the target area given by the target's own velocity and the time elapsing between launching of the missile and starting of the searching process. Thereby, rapid location of the target or targets is possible.

In accordance with the invention, apparatus for the searching, selecting and tracking of targets in a given range includes two switching arrangements having signal inputs to which there are fed a received echo signal, and having control inputs to which there are fed a signal indicating the position and duration of the range gate in question. The outputs of the switching arrangements are supplied to a differential amplifier, and the difference output of the amplifier is fed to at least one integrator. The output signal of the integrator is supplied, together with a sawtooth voltage signal furnished by a generator, to a comparator. The output of the comparator is connected to pulse circuits which determine the duration of the range gating pulse. The sawtooth generator is synchronized with the transmitter radiating the radar pulses. Further circuit arrangements are provided additionally, and these control the pulse circuits as a function of the signals appearing at the sum output of the differential amplifier.

By means of this relatively simply constructed apparatus, the invention method can be implemented in a simple and reliable manner especially if, in accordance with the further development of the invention, additional arrangements are provided by means of which an initial value can be present in the integrator as a function of the distance between the radar set and the target.

The pulse circuits controlling the width of the range-gating pulses in question can be provided either individually or separately for each individual gate pulse duration, or two pulse circuits can be provided and controlled so that they furnish gating pulses of any desired duration.

An object of the invention is to provide an improved method and apparatus for searching, selecting and tracking targets in a given range.

Another object of the invention is to provide such a method and apparatus utilizing a radar set having a range gate.

A further object of the invention is to provide such a method and apparatus in which two successive and continuous gating pulses, having equal durations, are generated responsive to transmission of each radar pulse.

Another object of the invention is to provide such a method and apparatus in which the two gating pulses are displaced, in time, relative to the echo pulses in a manner such that the echo pulse energy contents of the two gating pulses are equal.

A further object of the invention is to provide such a method and apparatus in which the durations of the two basic gating pulses are decreased to a combined duration substantially equal to the duration of an echo pulse.

For an understanding of the principles of the invention, reference is made to the following description of a typical embodiment thereof as illustrated in the accompanying drawing.

DESCRIPTION OF THE PREFERRED EMBODIMENT

Figure 1:
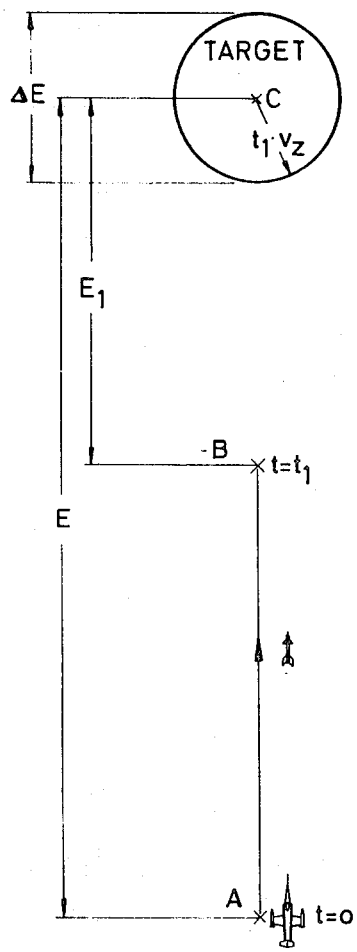
FIG. 1 is a schematic representation of the relations between a target's own velocity, the flight trajectory of the missile, and the size of the target area.

Referring to FIG. 1, a target at point C is being located at the point in time $t=0$ by a mother aircraft located at point A, the distance being E. Immediately after the locating process, the mother aircraft, at point A, launches a missile in the direction of point C, and this missile reaches point B in self-guided or unguided flight, at the time $t=t_1$, and switches on its search radar. The missile required a flight time $t_1$ from point A to point B, during which time the target at point C at the time $t_0$ was able to move on in accordance with its own velocity. If the target's own velocity is $v_r$, the radius of the deviation circle described around the point C equals $t_1 v_r$. The diameter $\Delta E$ of this deviation circle indicates the largest possible distance between two possible locations of the target at the time $t_1$.

Figure 2:
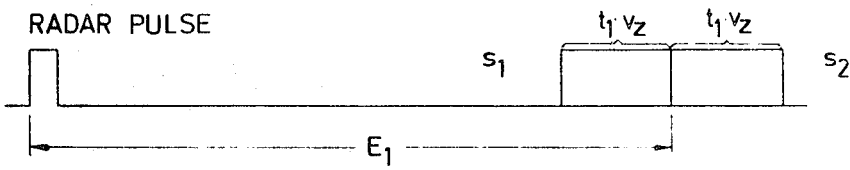
FIG. 2 is a graphical illustration of the gating pulses in relation to the radar pulses radiated by the search radar.

Referring to FIG. 2, the search radar head of the missile, when switched on at the point B at the time $t_1$, adjusts the length of the range gates $s_1$, $s_2$ so that the entire target area, having the extent $\Delta E$, can be covered simultaneously by the range gates. The position of the range gates is here determined by the distance $E_1$ between the points B and C, and which is fixed on the basis of the initial range $E$, set into the missile at its launching, and the distance travelled, as determined by the missile itself during its flight to the point B.

Figure 3:
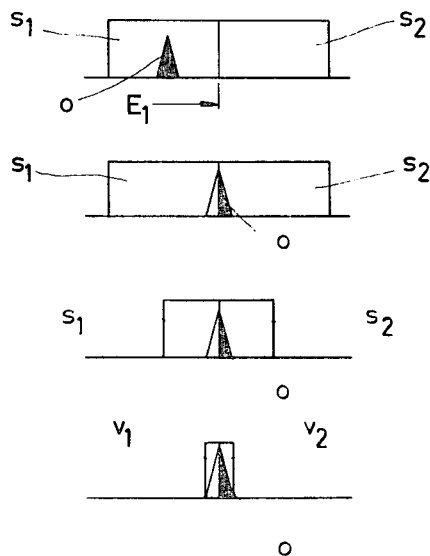
FIG. 3 is a schematic graphical representation of the displacement and shortening of the gating pulses in the presence of a single echo pulse.

Referring to FIG. 3, an echo pulse $o$ originating at the target occurs in one of the range gates $s_1$ and $s_2$. The two range gates now are displaced relative to this echo pulse $o$ in a manner such that the same energy content of the echo pulse always occurs during each individual gating pulse $s_1$ and $s_2$. For example, the gating pulses are displaced, together with their separation line, to the center of echo pulse $o$. Subsequently, gating pulses $s_1$ and $s_2$ are shortened uniformly, for example, by steps, until together they have only about the same length as that of the echo pulse $o$ originated by the target.

Figure 4:
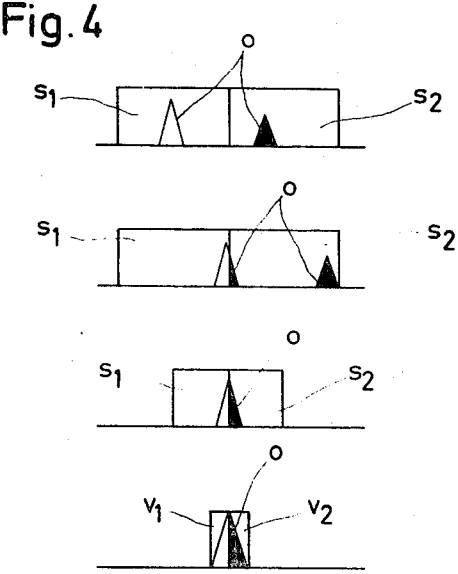
FIG. 4 is a view, similar to FIG. 3, but related to the presence of two echo pulses.

If, however, as shown in FIG. 4, two separate echo pulses appear during the two gating pulses when the search radar is switched on with one pulse having a smaller energy content than the other, the separation line between the two contiguous gating pulses $s_1$ and $s_2$ is displaced, between the two echo pulses $o$, in such a manner that, during each individual gating pulse, approximately the same energy content of the two echo pulses $o$ appears again. Upon subsequent shortening of gating pulses $s_1$, $s_2$, the echo pulse $o$ with the smaller energy content is automatically eliminated, whereupon the separation line of the two gating pulses $s_1$, $s_2$ is shifted to the center of the single remaining echo pulse $o$ having the larger energy content. Subsequently, the gating pulses are shortened to the length of the echo pulse, as in FIG. 3.

Figure 5:
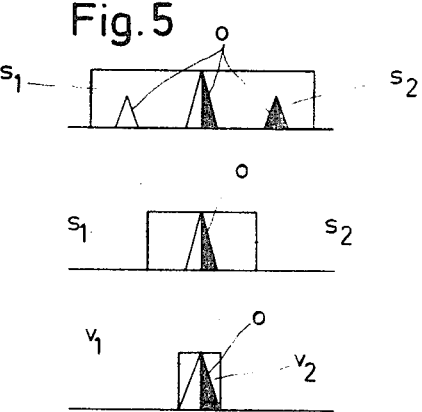
FIG. 5 is a view similar to FIG. 3, but related to the presence of three, substantially symmetrically located, echo pulses.
Figure 6:
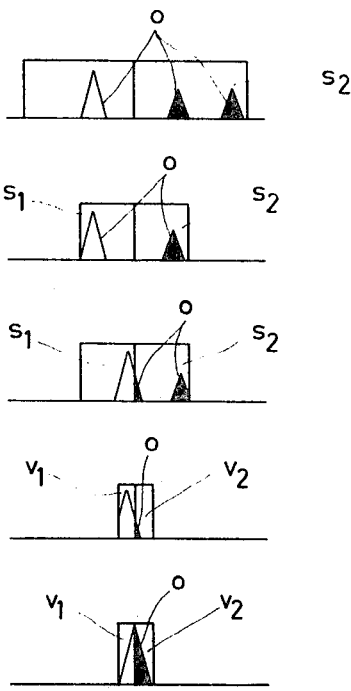
FIG. 6 is a view similar to FIG. 3, but related to the presence of three echo pulses which are not symmetrically located.

A corresponding operation of the search radar follows if, as shown in FIG 5, three echo pulses, that may be positioned symmetrically relative to each other and have different energy content, or if, as shown in FIG. 6, three echo pulses of different energy content and nonsymmetrical arrangement, are received upon switching on of the search radar.

It will be seen that, in all cases, due to the shortening of the gating pulses alone and their continuous readjustment to provide an always equal energy content in both gating pulses, the echo pulse $o$ with the largest energy content is automatically selected and finally tracked exclusively. Theoretically, this method would fail only if there appear, from different targets, echo pulses having exactly the same energy content and positioned exactly symmetrical with respect to the separation line of the two contiguous and nonseparated gating pulses $s_1$ and $s_2$. However, it will not be possible for such a case to occur in practice, because fluctuations of the target echo, and thereby of the echo pulses, are always present, as a result of which the separation line of the two gating pulses $s_1$ and $s_2$ never can coincide with the line of energy symmetry of the echo pulses, which latter are subject to variations.

Figure 7:
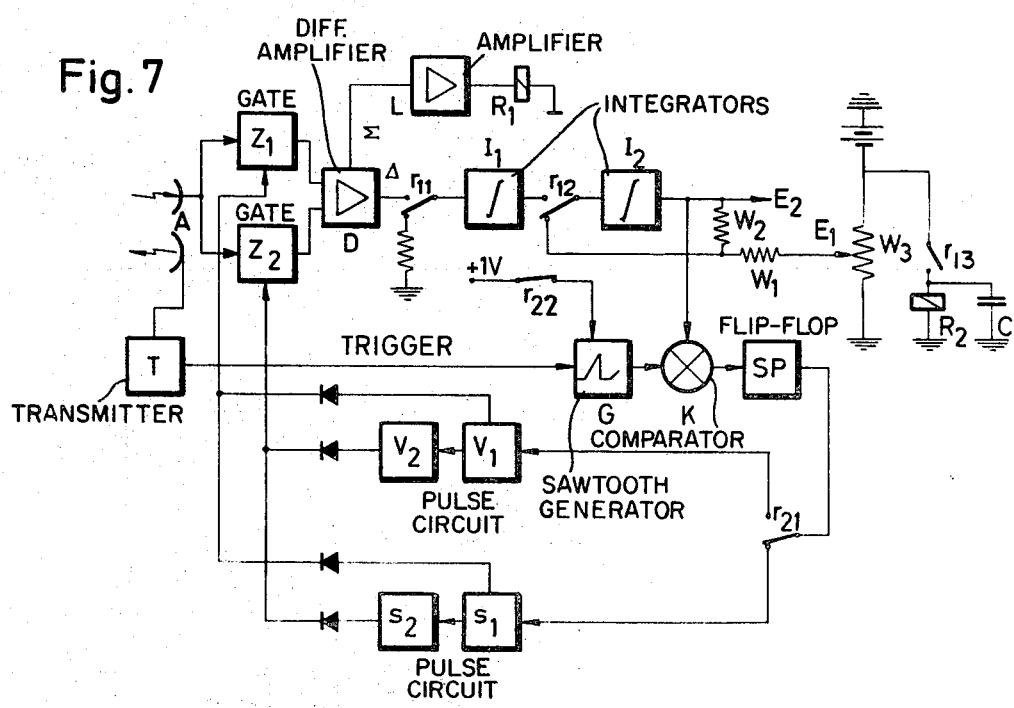
FIG. 7 is a block diagram of apparatus for implementing the invention method.

The embodiment of an apparatus for implementing the method, as shown in FIG. 7, includes a transmitter T which sends out the radar radiation of the search radar through an antenna A. An echo pulse, reflected by the target, is received through the same antenna, or by a second antenna, and is supplied to two switching arrangements $Z_1$ and $Z_2$. The outputs of these switching arrangements $Z_1$ and $Z_2$ are connected to the inputs of a differential amplifier D. The transmission times of the switching arrangements $Z_1$ and $Z_2$ always are controlled by the respective pulse circuits $S_1$ and $S_2$, and/or $V_1$ and $V_2$.

Through a first switching contact $r_{11}$, the output of differential amplifier D is connected with an input of a first integrator $I_1$, and the output of integrator $I_1$ is connected, through a second switching contact $r_{12}$, with the input of a second integrator $I_2$. The output of integrator $I_2$ is supplied to a first input of a comparator K, having a second input which is connected with the output of a sawtooth generator G. Through a flip-flop SP and a switching contact $R_{21}$, the output of comparator K controls either the pulse circuits $S_1$ and $S_2$ or the pulse circuits $V_1$ and $V_2$.

To sawtooth generator G is supplied, from radar transmitter T, a trigger signal, for synchronization, which makes the start of the rising flank of the saw-tooth signal coincide with the transmission of a radar pulse by transmitter T. There is a further supplied, to sawtooth generator G through a switching contact $r_{22}$, a positive DC voltage, which shifts the amplitude of the sawtooth signal, the magnitude of this voltage being determined by the extent of the target area to be searched. If, for example, a distance of 1,000 m./V. corresponds to the rise time of the sawtooth signal, the first range gate is displaced, toward smaller distances, by 1,000 m. for a DC voltage of 1 V.

Through switching contact $r_{12}$, located at the input of integrator $I_2$, an initial value $E_1$ can be preset into integrator $I_2$ through a resistance combination $W_1, W_2$ and $W_3$. This value $E_1$ corresponds to a target range at which the target would have to be if, in the meantime, it had not executed any motion of its own. Differential amplifier D controls, with a sum signal formed by the input signals, and through a further amplifier L, a relay $R_1$ which actuates switching contacts $r_{11}$, $r_{12}$ when differential amplifier D registers the presence of an echo pulse through the switching arrangements $Z_1$ and $Z_2$. Through a further switching contact $r_{13}$, a relay $R_2$ is switched on, and the pickup of relay $R_2$ is delayed by means of the capacitor C.

The arrangement shown in FIG. 7 now operates so that, on the basis of the target range E, determined by the mother aircraft, prior to the launching of the missile, an initial value $E_1$ is set into integrator $I_2$ through the resistance combination $W_1$, $W_2$, $W_3$, which fixes the position of the range gates when the search radar is switched on at the time $t=t_1$. As may be seen from FIG 8, the positive displacement of the sawtooth signal by 1 V to the dash-line position also causes an earlier start of the range gate pulse $s_1$. This point in time corresponds in the numerical example mentioned above to a target range of $E_1=1,000$ m. The duration of the gating pulses is also set for a distance of 1,000 m., so that this duration is about $6.66\mu s$. At the end of gating pulse $s_1$, gating pulse $s_2$ begins automatically, and the duration of gating pulse $s_2$ also corresponds to a distance of 1,000 m. For the duration of the two successive and contiguous gating pulses $s_1$ and $s_2$, a range area of plus or minus 1,000 m. about the rang fixed by the initial value $E_1$ therefore is searched.

Figure 8:
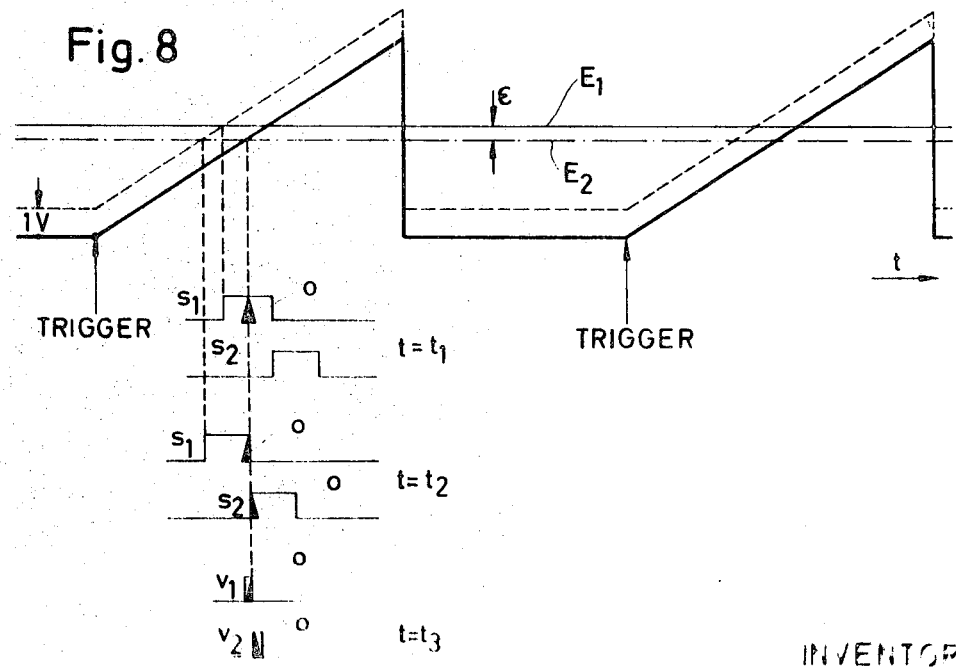
FIG. 8 is a graphical representation of the pulses, indicating the manner of operation of the arrangement shown in FIG. 7.

If, through receiving antenna A, one or more echo pulses arise simultaneously at the inputs of switching arrangements $Z_1$ and $Z_2$, which transmit always only for the duration of the respective gating pulses $s_1$ or $s_2$, the difference is formed in differential amplifier D from the energy content of the echo pulses provided separately by the respective switching arrangements $Z_1$ and $Z_2$. This difference signal, illustrated at $\epsilon$ in FIG. 8, changes, through the then closed switching contacts $r_{11}$, $r_{12}$, $r_{13}$ and the initial value $E_1$ contained in the integrators $I_1$ and $I_2$, to an instantaneous value $E_2$. This latter value is compared, in the comparator K, with the prevailing amplitude of the sawtooth signal, which is displaced by 1 V, as shown in FIG. 8.

Flip-flop SP controls the pulse circuits $S_1$ and $S_2$, when relay contact $R_{21}$ is in the position shown in the drawings, and controls the pulse circuits $V_1$ and $V_2$ when relay contact 21 is transferred. In each case, flip-flop SP energizes pulse circuits $S_1$ and $S_2$ or, respectively, $V_1$, $V_2$, alternately, with one pulse circuit being switched on simultaneously with switching off of the previously energized pulse circuit.

The gating pulses $s_1$ and $s_2$ are displaced, through pulse circuit $S_1$ and $S_2$, respectively, in a manner such that the received echo pulse $o$ lies, at the time $t=t_2$, exactly on the separation line between the successive and contiguous gating pulses $s_1$ and $s_2$. Thereby, within the two gating pulses, equal energy contents of the echo pulses $o$ is obtained. If this is the case, the output signal $\epsilon$ no longer appears at the output of differential amplifier D, and pulse circuits $S_1$ and $S_2$ are switched off through the relay $R_2$ and the switching contacts $r_{21}$, and pulse circuits $V_1$ and $V_2$ are switched one. These provide a very much smaller gating pulse duration which is only for example, of the order of the duration of the echo pulse so that, by means of these gating pulses $v_1$ and $v_2$, the tracking begins at the time $t=t_3$. At the same time, the DC voltage is disconnected from sawtooth generator G through opening of the other contact $r_{22}$, so that the start of the gating pulses of the pulse circuit $V_1$, and thus also of the pulse circuit $V_2$, depends only on the solid line sawtooth signal of FIG. 8.

In order to facilitate an understanding of the invention, the block diagram of FIG. 7 has been kept as simple as possible, so that only two different pulse circuit types are indicated and only two different gating pulse lengths can be generated. In practice, a multiplicity of such pulse circuits can be provided, or a single pulse circuit, which is controllable as to its pulse duration, can be used.

The switching over from the searching process, using the pulse circuits $S_1$ and $S_2$ connected in the circuit, to the tracking process, with the pulse circuits $V_1$ and $V_2$ connected in the circuit, is also presented as simply as possible in FIG. 7. This switching-over is attained, in the simplified example, by making the relay $R_1$ respond, through amplifier L, in the presence of an echo pulse registered by the differential amplifier.

Thereby, as already described, integrators $I_1$ and $I_2$ are set, from their initial value, to the actual value formed by the echo pulses. Through a further switching contact $r_{13}$, relay $R_2$ is simultaneously switched on, but its pickup is delayed by capacitor C shunted across it to such an extent that the search phase is completed prior to the response of relay $R_2$. In other words, the gating pulses have been displaced relative to the echo pulse or pulses in such a manner that during each gating pulse, echo pulses which are always equal in energy content occur.

In place of the delayed pickup of relay $R_2$, the latter also can be switched on only when the error signal $\beta$ falls below a predetermined threshold value. In that case, the delayed response of relay $R_2$ is adjusted exactly to the actual integration time and is not, as in the described example, equal to the maximum possible integration time.

While a specific embodiment of the invention has been shown and described in detail to illustrate application of the principles of the invention, it will be understood that the invention may be embodied otherwise without departing from such principles.

What is claimed is:

1. A method for searching, selecting and tracking targets in a given range, utilizing a search radar set having a range gate, said method comprising the steps of, responsive to transmission of each radar pulse, generating two successive and contiguous gating pulses having a duration and position, relative to the radar pulse, corresponding to the target area to be covered so as to contain all echo pulses corresponding to the radar pulses, with the durations of the two pulses being equal to each other; displacing the two gating pulses, in time, relative to the echo pulses in a time direction such that each of the two gating pulses contains the same content of echo pulse energy; and decreasing equally the durations of the two gating pulses to a combined duration substantially equal to the duration of one echo pulse while automatically displacing both gating pulses, in time, relative to the echo pulse in a time direction such that each of the two gating pulses contains the same content of echo pulse energy.

2. A method as claimed in claim 1, in which the durations of the two gating pulses are decreased continuously.

3. A method as claimed in claim 1, in which the durations of the two pulses are decreased stepwise.

4. A method as claimed in claim 1, in which the search radar set is carried by a missile, including the step of, immediately prior to launching of the missile, determining, by a radar equipment separate from the search radar carried by the missile, information regarding a target to be hit and setting such information into the missile; and switching on the search radar carried by the missile after the missile has traveled a predetermined distance in the direction of the target.

5. Apparatus for searching, selecting and tracking targets in a given range, utilizing a radar set having a range gate, said apparatus comprising, in combination, radar pulse transmitter means; echo pulse receiver means; gating-pulse-generating means; means connecting said gating-pulse-generating means to said radar pulse transmitter means; said gating pulse generator means, responsive to transmission of each radar pulse, generating two successive and contiguous gating pulses having duration and position, relative to the radar pulse, corresponding to the target area to be covered so as to contain all echo pulses corresponding to the radar pulse; pulse displacing means connected to said receiver means and to said gating-pulse-generating means and operable, responsive to receipt of echo pulses, to displace the two gating pulses in time, relative to the echo pulses, in a time direction such that each of the two gating pulses contains the same content of echo pulse energy; and pulse duration controlling means connected to said receiver means and operable to decrease equally the durations of the two gating pulses to a combined duration substantially equal to the duration of one echo pulse during continued operation of said pulse displacing means.

6. Apparatus as claimed in claim 5, said range gate including two switching devices each having a signal input connected to said echo pulse receiver means to receive an echo signal and each having a control input supplied with a respective signal giving the position and duration of a respective gating pulse then operative, each switching device having an output; said displacing means including a differential amplifier having a pair of inputs each connected to the output of a respective switching device, said differential amplifier having a difference output; said displacing means further including at least one integrator connected to the difference output of said differential amplifier; a comparator included in said displacing means and having an output connected to said gating-pulse-generating means; a sawtooth signal generator; means applying the output signal of said integrator and the output of said sawtooth signal generator to said comparator; means connecting said sawtooth signal generator to said radar pulse transmitter means for synchronizing by said radar pulse transmitter means.

7. Apparatus as claimed in claim 6, in which said differential amplifier has a sum output; said pulse duration controlling means including further switching devices connected to the sum output of said differential amplifier and to said gating-pulse-generating means, said further switching devices controlling said gating pulse-generating means as a function of the signal appearing at the sum output of said differential amplifier.

8. Apparatus as claimed in claim 7, in including an impedance network connected to said integrator and operable to preset, into said integrator, an initial value which is a function of the distance between said radar set and the target.

9. Apparatus as claimed in claim 7, in which said gating-pulse-generating means comprises two pairs of gating pulse generators, one generator of each pair being connected to the control input of one of said first-mentioned switching devices and the other generator of each pair being connected to the control input of the other of said first-mentioned switching devices; said further switching devices including a first relay operating first switching means selectively operable to connect said integrator to the difference output of said differential amplifier; said pulse-duration-controlling means including a second relay including second switching means operable to selectively connect either of said pairs of said pulse generators to said comparator; said first switching means controlling energization of said second relay.

10. Apparatus, as claimed in claim 9, in which said second relay has a delayed pickup.

* * * * *